(12) United States Patent
Iwamura et al.

(10) Patent No.: US 8,983,428 B2
(45) Date of Patent: Mar. 17, 2015

(54) MOBILE COMMUNICATION SYSTEM, HOME BASE STATION, AND MOBILE STATION

(75) Inventors: Mikio Iwamura, Yokohama (JP); Masafumi Masuda, Yokosuka (JP); Takaaki Sato, Kawasaki (JP); Takehiro Nakamura, Yokohama (JP)

(73) Assignee: NTT DOCOMO, INC., Tokyo (JP)

( * ) Notice: Subject to any disclaimer, the term of this patent is extended or adjusted under 35 U.S.C. 154(b) by 191 days.

(21) Appl. No.: 12/740,536

(22) PCT Filed: Oct. 28, 2008

(86) PCT No.: PCT/JP2008/069565
§ 371 (c)(1),
(2), (4) Date: Jun. 29, 2010

(87) PCT Pub. No.: WO2009/057602
PCT Pub. Date: May 7, 2009

(65) Prior Publication Data
US 2010/0273448 A1 Oct. 28, 2010

(30) Foreign Application Priority Data
Oct. 29, 2007 (JP) ................. 2007-281021

(51) Int. Cl.
*H04W 4/00* (2009.01)
*H04W 48/08* (2009.01)

(52) U.S. Cl.
CPC ..................................... *H04W 48/08* (2013.01)
USPC .......................................... 455/406; 455/434

(58) Field of Classification Search
CPC .................... H04W 36/0066; H04W 72/0406; H04W 12/02; H04L 5/0073; H04L 63/104; H04J 11/0069; H04J 11/0079
USPC .......... 455/422.1, 436, 561, 67.11–67.7, 439, 455/435.1, 426.1, 453, 552.1, 434, 446, 455/525, 406, 560, 441, 432.1, 435.2, 224
See application file for complete search history.

(56) References Cited

U.S. PATENT DOCUMENTS

| 2002/0197992 | A1* | 12/2002 | Nizri et al. | ..................... 455/435 |
| 2005/0070283 | A1 | 3/2005 | Hashimoto et al. | |
| 2006/0111110 | A1* | 5/2006 | Schwarz et al. | .............. 455/439 |

(Continued)

FOREIGN PATENT DOCUMENTS

| CN | 101855919 A | 10/2010 |
| JP | 2005-109570 A | 4/2005 |

OTHER PUBLICATIONS

International Search Report w/translation from PCT/JP208/069565 dated Feb. 10, 2009 (4 pages).

(Continued)

*Primary Examiner* — Chuong A Ngo
(74) *Attorney, Agent, or Firm* — Osha Liang LLP (57) ABSTRACT

In a mobile communication system according to the present invention, the mobile communication system is configured to manage a specific mobile station which is allowed to communicate through a CSG cell under the control of a home base station (Home-eNB); and a general mobile station (UE) other than the specific mobile station is configured to be capable of using the CSG cell as a camped cell, only when broadcast information indicating an allowance of a camping in the specific cell is received.

7 Claims, 6 Drawing Sheets

(56) References Cited

U.S. PATENT DOCUMENTS

| | | | |
|---|---|---|---|
| 2008/0267153 A1* | 10/2008 | Mukherjee et al. | 370/338 |
| 2009/0047931 A1* | 2/2009 | Nanda et al. | 455/411 |
| 2009/0047968 A1* | 2/2009 | Gunnarsson et al. | 455/446 |
| 2009/0070694 A1 | 3/2009 | Ore et al. | |
| 2010/0298017 A1* | 11/2010 | Dalsgaard et al. | 455/507 |

OTHER PUBLICATIONS

Written Opinion from PCT/JP2008/069565 dated Feb. 10, 2009 (3 pages).
3GPP TSG RAN WG3 Meeting #56, R3-070781; Restricted and Opened Home NodeBs (HNBs); Mitsubishi Electric; Kobe, Japan; May 7-11, 2007 (3 pages).
3GGPP TSG RAN WG2 #60, R2-075150; "CSG with limited open access"; NTT DoCoMo et al.; Jeju, Korea; Nov. 5-9, 2007 (2 pages).
3GPP TSG RAN WG2 #60, R2-075151; "Clarification of Home 3NB scenarios and issues for RAN2/3/4"; NTT DoCoMo et al.; Jeju, Korea; Nov. 5-9, 2007 (3 pages).
3GPP TS 36.300 v8.1.0 :Evolved Universal Terrestrial Radio Access (E-UTRA) and Evolved Universal Terrestrial Radio Access Network (E-UTRAN); Overall Description; Jun. 2007 (106 pages).
Office Action for Russian Application No. 2010118802/07 dated Sep. 11, 2012, with English translation thereof (8 pages).
Office Action for Chinese Patent Application No. 200880113942.3 issued Sep. 3, 2012, with English translation thereof (10 pages).
Office Action in corresponding Chinese application No. 200880113942.3 dated Apr. 3, 2013 (11 pages).

* cited by examiner

MOBILE COMMUNICATION SYSTEM, HOME BASE STATION, AND MOBILE STATION

TECHNICAL FIELD

The present invention relates to a mobile communication system, a home base station, and a mobile station.

BACKGROUND ART

Discussions have been in progress on a home base station Home-eNB in RAN-WG of the "LTE (Long Term Evolution)" in the 3GPP (3rd Generation Partnership Project).

Specifically, according to the current 3GPP specifications, a mobile communication system is configured to manage a specific mobile station (a specific mobile station which is allowed to communicating through a specific cell) belonging to a CSG (Closed Subscriber Group) under the control of a home base station Home-eNB or a macro base station eNB.

In other words, according to the current 3GPP specifications, only a specific mobile station belonging to a CSG is configured to be capable of communicating through the CSG cell (the specific cell) under the control of the home base station Home-eNB or the macro base station eNB.

However, in the current 3GPP specifications, even when a general mobile station other than the specific mobile station cannot detect a cell fulfilling a predetermined radio condition, except for the CSG cell, the general mobile station cannot perform a communication through the CSG cell.

In general, the home base station Home-eNB is supposed to be installed inside a building and is also supposed to be installed in a place where radio waves from the macro base station eNB installed outside buildings in the public wireless network are not detected. Accordingly, as described above, it is believed that there often occurs a situation in which a general mobile station other than the specific mobile station cannot detect a cell fulfilling a predetermined radio condition except for the CSG cell under the control of the home base station Home-eNB.

In such a case, even when there are available radio resources left in the CSG cell, the general mobile station cannot use the CSG cell as a camped cell and becomes out of service.

Meanwhile, when many CSG cells are operated at the same frequency band as that of the public wireless network (a macro cell), there arises a problem of mutual interference.

For example, when a mobile station without an access right to the CSG cell performs a communication with a macro cell in a place close to the CSG cell having a less transmission loss, an uplink interference with the CSG cell is considerably increased.

In contrast, in a downlink communication of the mobile station, an interference from the radio waves from the CSG cell occurs, and thus a communication quality is considerably deteriorated.

Meanwhile, when many CSG cells are operated at a frequency band different from that of the macro cell, there arises a problem of interference between the different CSG cells.

In particular, the home base station is supposed to be installed by an end user, and therefore a cell designing is supposed not to be sufficiently made. Accordingly, the mutual interference between the CSG cells can be a serious problem.

DISCLOSURE OF THE INVENTION

The present invention has been made in light of the above-described problem. An object of the invention is to provide a mobile communication system, a base station, and a mobile station with which a general mobile station other than a specific mobile station can be allowed to communicating through a specific cell (a CSG cell) by transmitting broadcast information.

A first aspect of the present invention is summarized as a mobile communication system, wherein the mobile communication system is configured to manage a specific mobile station which is allowed to communicate through a specific cell; and a general mobile station other than the specific mobile station is configured to be capable of using the specific cell as a camped cell, only when broadcast information indicating an allowance of a camping in the specific cell is received.

In the first aspect, the general mobile station can be configured to be capable of using the specific cell as a camped cell, only when the broadcast information indicating an allowance of a camping in the specific cell is received, and when a cell fulfilling a predetermined radio condition is not detected except for the specific cell.

In the first aspect, the general mobile station using the specific cell as a camped cell can be configured to be capable of communicating through the specific cell, as long as broadcast information indicating a prohibition of a communication through the specific cell is not received.

In the first aspect, a reception control method for a mobile originating call request transmitted by the specific mobile station to the specific cell can be configured to be differentiated from a reception control method for a mobile originating call request transmitted by the general mobile station to the specific cell.

In the first aspect, a transmission probability or a restriction probability of a mobile originating call request for the specific cell by the specific mobile station can be configured to be differentiated from a transmission probability or a restriction probability of a mobile originating call request for the specific cell by the general mobile station.

In the first aspect, a charge of a communication performed by the specific mobile station through the specific cell can be configured to be differentiated from a charge of a communication performed by the general mobile station through the specific cell.

In the first aspect, a type of communication service providable to the specific mobile station through the specific cell can be configured to be differentiated from a type of communication service providable to the general mobile station through the specific cell.

In the first aspect, a data transmission rate in an uplink communication performed by the specific mobile station through the specific cell can be configured to be differentiated from a data transmission rate in an uplink communication performed by the general mobile station through the specific cell.

In the first aspect, a service quality of a communication performed by the specific mobile station through the specific cell can be configured to be differentiated from a service quality of a communication performed by the general mobile station through the specific cell.

A second aspect of the present invention is summarized as a base station which is provided in a mobile communication system configured to manage a specific mobile station which is allowed to communicating through a specific cell, the base station including: a broadcast information transmitter section configured to transmit broadcast information to a general mobile station other than the specific mobile station, the broadcast information indicating whether or not the general mobile station is allowed a camping in the specific cell.

In the second aspect, the broadcast information transmitter section can be configured to transmit broadcast information indicating an allowance of a camping in the specific cell, to the general mobile station, only when broadcast information indicating an allowance of a camping in the specific cell is received, and when a cell fulfilling a predetermined radio condition is not detected except for the specific cell.

In the second aspect, the broadcast information transmitter section can be configured to separately transmit broadcast information to each of the specific mobile station and the general mobile station, the broadcast information indicating whether or not a communication through the specific cell is prohibited according to a radio condition.

In the second aspect, the broadcast information transmitter section can be configured to separately transmit broadcast information to each of the specific mobile station and the general mobile station, the broadcast information indicating a transmission probability or a restriction probability of a mobile originating call request for the specific cell.

In the second aspect, the broadcast information transmitter section can be configured to separately transmit broadcast information to each of the specific mobile station and the general mobile station, the broadcast information indicating a type of communication service providable through the specific cell.

In the second aspect, the base station can include a scheduler section configured to separately notify, to each of the specific mobile station and the general mobile station, a data transmission rate in an uplink communication to be performed through the specific cell.

A third aspect of the present invention is summarized as a mobile station which is used in a mobile communication system configured to manage a specific mobile station which is allowed to communicating through a specific cell, the mobile station including: a camped cell determination section configured to be capable of using the specific cell as a camped cell, only when the mobile station is not managed as the specific mobile station, and when broadcast information indicating an allowance of a camping in the specific cell is received.

In the third aspect, the camped cell determination section can be configured to be capable of using the specific cell as a camped cell, only when the mobile station is not managed as the specific mobile station, when a cell fulfilling a predetermined radio condition is not detected except for the specific cell, and when the broadcast information indicating an allowance of a camping in the specific cell is received.

In the third aspect, the mobile station can include a mobile originating call processor section configured to be capable of transmitting a mobile originating call request to the specific cell, when the specific cell is used as a camped cell, unless the broadcast information indicating a prohibition of a communication through the specific cell is received.

BEST MODE FOR CARRYING OUT THE INVENTION

Configuration of a Mobile Communication System According to First Embodiment of the Invention Referring to FIGS. 1 to 4, a configuration of a mobile communication system according to a first embodiment of the invention is described.

Figure 1:
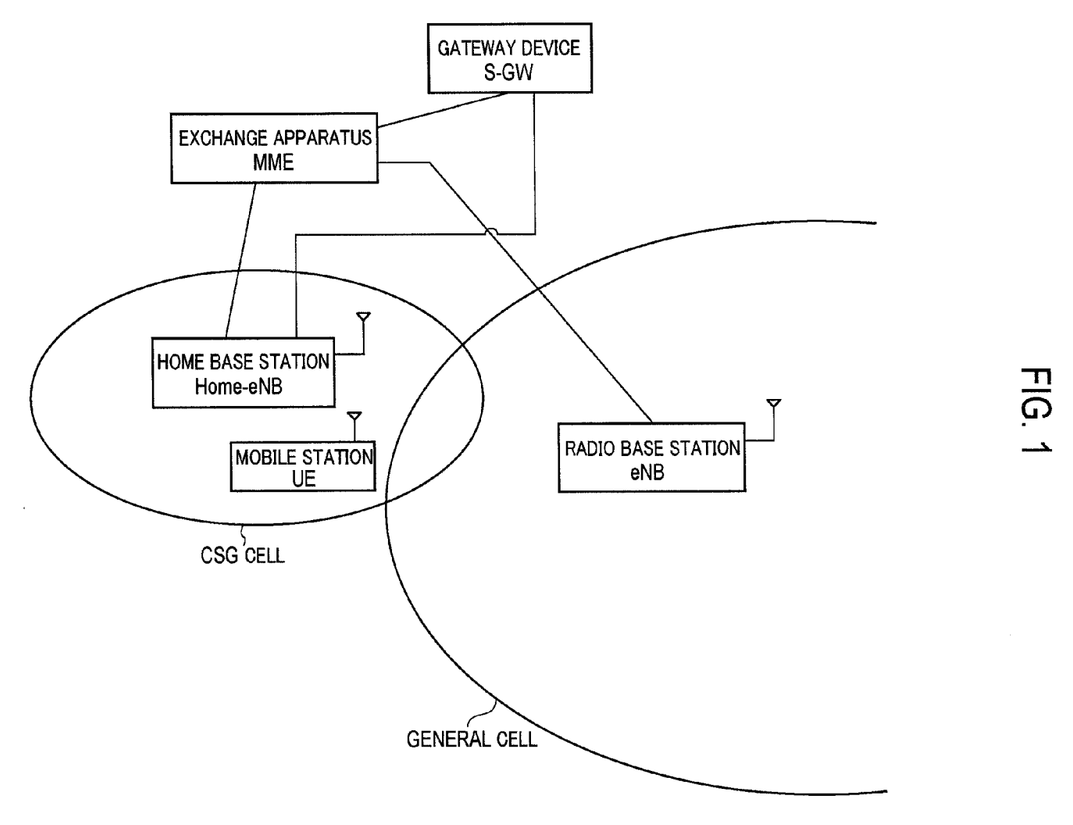
FIG. 1 is an overall configuration diagram of a mobile communication system according to a first embodiment of the present invention.

As shown in FIG. 1, a mobile communication system according to this embodiment includes a gateway device S-GW (Serving Gateway), an exchange apparatus MME (Mobility Management Entity), a home base station Home-eNB managing a CSG cell (a specific cell), a macro base station managing a general cell, and a mobile station UE.

Here, the CSG cell is a cell in which a CSG is set and the general cell is a cell in which a CSG is not set, the CSG being a group having an access right.

In addition, the mobile station UE serves as a "general mobile station" when the mobile station UE does not belong to a CSG and serves as a "specific mobile station" when the mobile station UE belongs to a CSG (i.e., in a case where the mobile station UE is managed as a mobile station which is allowed to communicate through a CSG cell).

It should be noted that the CSG can be set for a macro base station eNB which is installed in an office environment, a coffee shop, or a school, in addition to the home base station Home-eNB which is installed in a so-called home.

For example, supposed is a case where an access right is given only to office employees or an access right is temporarily given to employees and customers of a coffee shop.

In this case, there is also a case where one CSG is set across multiple cells or multiple base stations. A variety of mobile stations from a small and low consumption powered mobile station to a large and high consumption powered base station are included.

Accordingly, hereinafter in the description, these scenarios are contained, and, for convenience, it is assumed that a home base station Home-eNB and a macro base station eNB which manage a cell set to be a CSG are collectively referred to as a "home base station Home-eNB".

In the mobile communication system according to this embodiment, the general mobile station is configured to be capable of using the CSG cell as a camped cell, only when broadcast information indicating an allowance of a camping in the CSG cell is received.

In particular, in the mobile communication system according to this embodiment, the general mobile station can be configured to be capable of using the CSG cell as a camped cell, only when a cell (a general cell) fulfilling a predetermined radio condition cannot be detected except for the CSG cell (the specific cell), and when the broadcast information indicating an allowance of a camping in the CSG is received.

For example, in the mobile communication system according to this embodiment, the general mobile station can be configured to be capable of using the CSG cell as a camped cell, only when a cell (a general cell) fulfilling a predetermined radio condition cannot be detected at a frequency different from a frequency which is utilized in the CSG cell, and when the broadcast information indicating an allowance of a camping in the CSG is received.

In addition, in the mobile communication system according to this embodiment, the general mobile station using the CSG cell as the camped cell is configured to be capable of communicating through the CSG cell, as long as broadcast information indicating an allowance of a communication through the CSG cell is not received.

In addition, in the mobile communication system according to this embodiment, a reception control method for a mobile originating call request which is transmitted by the specific mobile station to the CSG cell can be configured to be differentiated from a reception control method for a mobile originating call request which is transmitted by the general mobile station to the CSG cell.

In addition, in the mobile communication system according to this embodiment, a transmission probability or restriction probability of the mobile originating call request transmitted by the specific mobile station to the CSG cell can be configured to be differentiated from a transmission probability or restriction probability of the mobile originating call request transmitted by the general mobile station to the CSG cell.

In addition, in the mobile communication system according to this embodiment, a charge of the communication performed by the specific mobile station through the CSG cell can be configured to be differentiated from a charge of the communication performed by the general mobile station through the CSG cell.

In addition, in the mobile communication system according to this embodiment, a type of communication service which can be provided to the specific mobile station through the CSG cell can be configured to be differentiated from a type of communication service which can be provided to the general mobile station through the CSG cell.

In addition, in the mobile communication system according to this embodiment, a data transmission rate in an uplink communication performed by the specific mobile station through the CSG cell can be configured to be differentiated from a data transmission rate in an uplink communication performed by the general mobile station through the CSG cell.

Furthermore, in the mobile communication system according to this embodiment, a service quality of the communication performed by the specific mobile station through the CSG cell can be configured to be differentiated from a service quality of the communication performed by the general mobile station through the CSG cell.

Figure 2:
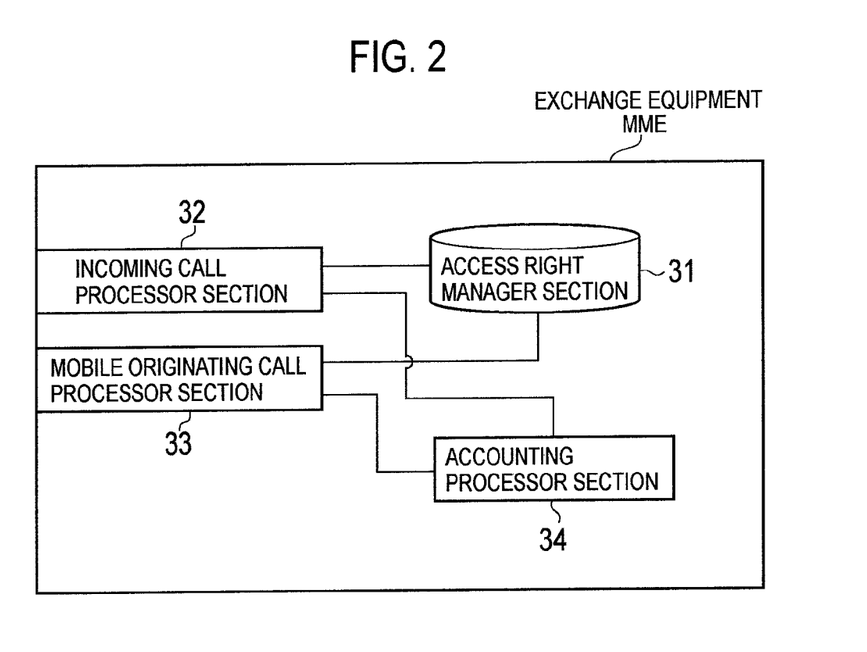
FIG. 2 is a functional block diagram of exchange apparatus according to the first embodiment of the present invention.

As shown in FIG. 2, the exchange apparatus MME includes an access right manager section 31, an incoming call processor section 32, a mobile originating call processor section 33, and an accounting processor section 34.

The access right manager section 31 is configured to manage specific mobile stations (mobile stations permitted a communication through CSG cells) in CSG cells under control of home base stations Home-eNB connected to the exchange apparatus MME.

In addition, the access right manager section 31 is configured to manage, with respect to each cell, on whether or not to allow a camping of a general mobile station in the CSG cell.

Specifically, the access right manager section 31 may manage, with respect to each cell, so as to allow a camping of a general mobile station in the CSG cell, only when a general cell fulfilling a predetermined radio condition cannot be detected except for the CSG cell.

Alternatively, the access right manager section 31 may manage, with respect to each cell, so as to allow a camping of the general mobile station in the CSG cell, regardless of whether or not a general cell fulfilling a predetermined radio condition can be detected except for the CSG cell.

The incoming call processor section 32 is configured to perform incoming call processing for mobile stations UE which are performing a camping in the CSG cells under control of the respective home base stations Home-eNB and general cells under control of radio base stations eNB, the home base stations Home-eNB and the radio base stations eNB being connected to the exchange apparatus MME.

For example, the incoming call processor section 32 is configured to transfer a paging signal to a home base station Home-eNB or a radio base station eNB which manages the camped cell of one of the mobile stations UE, the paging signal being received from the gateway device S-GW and addressed to the mobile station UE.

However, the incoming call processor section 32 may be configured not to transfer a paging signal addressed to a general mobile station to a home base station Home-eNB managing the camped cell (the CSG cell) of the general mobile station, when the general mobile station is set to be prohibited in the CSG cell from performing a communication through the CSG cell, and even when the paging signal addressed to the general mobile station is received from the gateway device S-GW.

In addition, the incoming call processor section 32 may be configured not to transfer a paging signal addressed to a specific mobile station to a home base station Home-eNB managing the camped cell (the CSG cell) of the specific mobile station, when the specific mobile station is prohibited in the CSG cell from performing a communication through the CSG cell, and even when the paging signal addressed to the specific mobile station is received from the gateway device S-GW.

The mobile originating call processor section 33 is configured to perform mobile originating call processing in response to a mobile originating call request (Service Request) transmitted from one of the mobile stations UE which is performing a camping in the CSG cell under control of the respective home base stations Home-eNB and the general cells under control of the radio base stations eNB, the home base stations Home-eNB and the radio base stations eNB being connected to the exchange apparatus MME.

For example, the mobile originating call processor section 33 may be configured not to accept the mobile originating call request (Service Request) from the general mobile station, when the general mobile station is prohibited in the camped cell (the CSG cell) of the general mobile station from performing a communication through the CSG cell, and even when the mobile originating call request (Service Request) is received from the general mobile station.

In addition, the mobile originating call processor section 33 may be configured not to accept the mobile originating call request (Service Request) from the specific mobile station, when the specific mobile station is prohibited in the camped cell (the CSG cell) of the specific mobile station from performing a communication through the CSG cell, and even when the mobile originating call request (Service Request) is received from the specific mobile station.

In addition, the mobile originating call processor section 33 is configured to determine a service quality of the communication to be performed by the mobile station UE through the CSG cell, and to give a notification of the determined service quality in response to the mobile originating call request (Service Request) transmitted from the mobile station UE.

For example, the mobile originating call processor section 33 is configured to determine a QoS (Quality of Service) class in the communication, including a "compensated transmission rate GBR (Guaranteed Bit Rate)", a "maximum transmission rate", an "allowable delay time", and an "allowable data loss factor", as the service quality, for example.

Here, the mobile originating call processor section 33 may determine the service quality (QoS class) in the communication which is performed by the specific mobile station through the CSG cell and the service quality (QoS class) in the communication which is performed by the general mobile station through the CSG cell so as to be different from each other.

The accounting processor section 34 is configured to generate accounting data for calculating charges of the communications which are performed through the CSG cell under control of the respective home base stations Home-eNB and the general cells under control of the radio base stations eNB, the home base stations Home-eNB and the radio base stations eNB being connected to the exchange apparatus MME.

For example, the accounting processor section 34 may generate accounting data so as to identify that the accounting data is accounting data for calculating the charge of the communication performed by the specific mobile station through the CSG cell or is accounting data for calculating the charge of the communication performed by the general mobile station.

Figure 3:
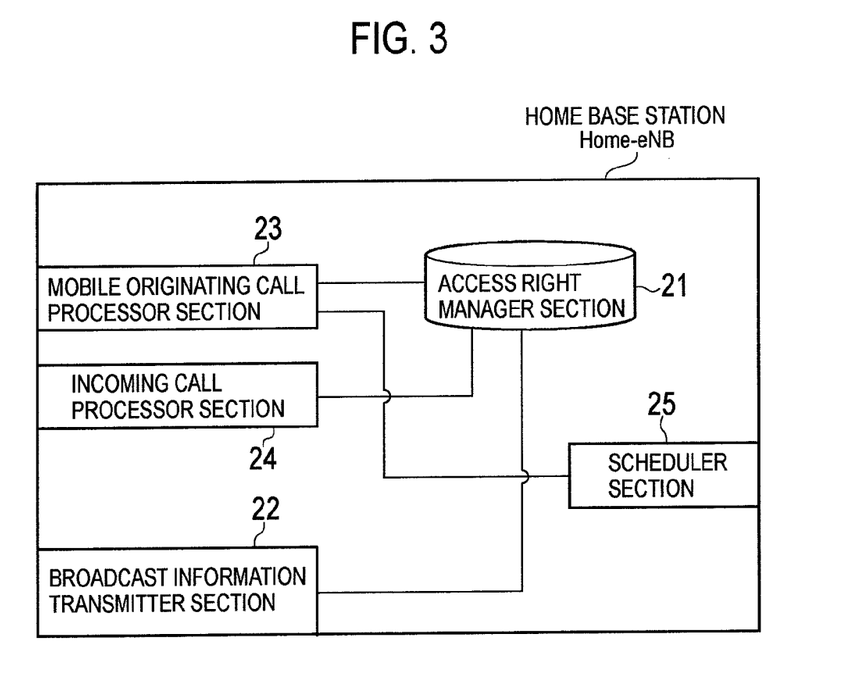
FIG. 3 is a functional block diagram of a home base station according to the first embodiment of the present invention.

As shown in FIG. 3, the home base station Home-eNB includes an access right manager section 21, a broadcast information transmitter section 22, a mobile originating call processor section 23, an incoming call processor section 24, and a scheduler section 25.

The access right manager section 21 is configured to perform a management of the specific mobile stations (the mobile stations which is allowed to communicating through the CSG cells) in the CSG cells under control of the home base stations Home-eNB.

In addition, the access right manager section 21 is configured to manage, with respect to each cell, on whether or not to allow a camping of the general mobile station in the CSG cell.

Specifically, the access right manager section 21 may manage, with respect to each cell, so as to allow a camping of the general mobile station in the CSG cell, only when a general cell fulfilling a predetermined radio condition cannot be detected except for the CSG cell.

Specifically, the access right manager section 21 may manage, with respect to each cell, so as to allow a camping of the general mobile station in the CSG cell, only when a general cell fulfilling a predetermined radio condition cannot be detected in a frequency different from the frequency which is utilized in the CSG cell.

Alternatively, the access right manager section 21 may manage, with respect to each cell, so as to allow a camping of the general mobile station in the CSG cell, regardless of whether or not a general cell fulfilling a predetermined radio condition can be detected except for the CSG cell.

It should be noted that the home base station Home-eNB may be configured not to include the access right manager section 21 in consideration of security and the like, because the home base station Home-eNB could be installed within a reach of the user.

The broadcast information transmitter section 22 is configured to transmit various pieces of broadcast information to the mobile stations UE (the specific mobile station and the general mobile station) which are performing the camping in the CSG cell under control of the home base station Home-eNB.

Specifically, the broadcast information transmitter section 22 may be configured to transmit the broadcast information by mapping the broadcast information to a BCH (Broadcast Channel) or a SU (Scheduling Unit), for example.

For example, the broadcast information transmitter section 22 may be configured to transmit broadcast information ("CSG Flag") for indicating whether or not the cell is a CSG cell (i.e., whether or not a CSG is set for the cell) by mapping the broadcast information to a BCH.

In addition, the broadcast information transmitter section 22 may be configured to transmit information relating to the CSG cell ("TA (Tracking Area)-ID" and "Cell-ID") by mapping the information to a SU-1.

In addition, the broadcast information transmitter section 22 may be configured to transmit broadcast information (e.g., a 1-bit flag) to the general mobile station, by mapping the broadcast information to the SU-1 (SIB-1), the broadcast information indicating whether or not a camping in the CSG cell is allowed when a cell fulfilling a predetermined radio condition cannot be detected except for the CSG cell.

In addition, the broadcast information transmitter section 22 may be configured to transmit broadcast information of any one of the following to the general mobile station, with, for example, a 2-bit flag, by mapping the broadcast information to the SU-1 (SIB-1). The broadcast information notifies that "a camping in the CSG cell is allowed only when a cell fulfilling a predetermined radio condition cannot be detected except for the CSG cell", "a camping in the CSG cell is allowed regardless of whether or not a cell fulfilling a predetermined radio condition can be detected except for the CSG cell," and "a camping in the CSG cell is not allowed".

In addition, the broadcast information transmitter section 22 may be configured to separately transmit broadcast information (e.g., a 1-bit flag) to each of the specific mobile station and the general mobile station, by mapping the broadcast information to the SU-1 (SIB-1) according to a radio condition (e.g., a congestion degree), the broadcast information indicating whether or not a communication through the CSG cell under control of the home base station Home-eNB is prohibited.

In addition, the broadcast information transmitter section 22 may be configured to separately transmit broadcast information to each of the specific mobile station and the general mobile station, by mapping the broadcast information to the SU-1 (SIB-1), the broadcast information indicating a transmission probability (e.g., a % value) or a restriction probability of the mobile originating call request for the CSG cell.

Here, the transmission probability or restriction probability of the mobile originating call request means a probability that transmission of the generated mobile originating call request is permitted or restricted.

It should be noted that the broadcast information transmitter section 22 may be configured to transmit broadcast information only to the general mobile station, the broadcast information indicating the transmission probability (e.g., a % value) or the restriction probability of the mobile originating call request for the CSG cell.

Furthermore, the broadcast information transmitter section 22 may be configured to separately transmit broadcast information to each of the specific mobile station and the general mobile station, by mapping the broadcast information to the SU-1 (SIB-1), the broadcast information indicating a type of communication service which can be provided through the CSG cell.

For example, the broadcast information transmitter section 22 may be configured to transmit "voice service", "GBR service other than voice", and "burst-type service" to the specific mobile station, and to transmit only "voice service" to the general mobile station, as the type of communication service which can be provided through the CSG cell.

In addition, the broadcast information transmitter section 22 may give a notification of the type of communication service which can be provided through the CSG cell by using a bit map pattern (e.g., setting "1" to the bit corresponding to the communication service which can be provided).

The mobile originating call processor section 23 is configured to perform mobile originating call processing in response to a mobile originating call request (Connection Request) transmitted from the mobile station UE which is performing a camping in the CSG cell under control of the home base station Home-eNB or the general cell under control of each radio base station eNB.

For example, the mobile originating call processor section 23 may be configured not to accept the mobile originating call request (Service Request) from the general mobile station, when the general mobile station is set to be prohibited in the camped cell (the CSG cell) of the general mobile station from performing a communication through the CSG cell, and even when the mobile originating call request (Connection Request) is received from the general mobile station.

In addition, the mobile originating call processor section 23 may be configured not to accept the mobile originating call request (Service Request) from the specific mobile station, when the specific mobile station is set to be prohibited in the camped cell (the CSG cell) of the specific mobile station from performing a communication through the CSG cell, and even when the mobile originating call request (Connection Request) is received from the specific mobile station.

The incoming call processor section 24 is configured to perform incoming call processing for the mobile station UE which is performing a camping in the CSG cell under control of the home base station Home-eNB.

For example, the incoming call processor section 24 is configured to transfer a paging signal which is received from the exchange apparatus MME and is addressed to the mobile station UE, to the camped cell (the CSG cell) of the mobile station UE.

However, the incoming call processor section 24 may be configured not to transfer the paging signal addressed to the general mobile station, when the general mobile station is set to be prohibited in the camped cell (the CSG cell) of the general mobile station from performing a communication through the CSG cell, and even when the paging signal addressed to the general mobile station is received from the exchange apparatus MME.

In addition, the incoming call processor section 24 may be configured not to transfer the paging signal addressed to the specific mobile station, when the specific mobile station is set to be prohibited in the camped cell (the CSG cell) of the specific mobile station from performing a communication through the CSG cell, and even when the paging signal addressed to the specific mobile station is received from the exchange apparatus MME.

The scheduler section 25 is configured to transmit a scheduling signal indicating a data transmission rate by assigning the data transmission rate in an uplink communication to the mobile station UE which is performing a communication in the CSG cell under control of the home base station Home-eNB.

For example, the scheduler section 25 may be configured to separately notify, to each of the specific mobile station and the general mobile station, the data transmission rate in the uplink communication to be performed through the CSG cell.

Figure 4:
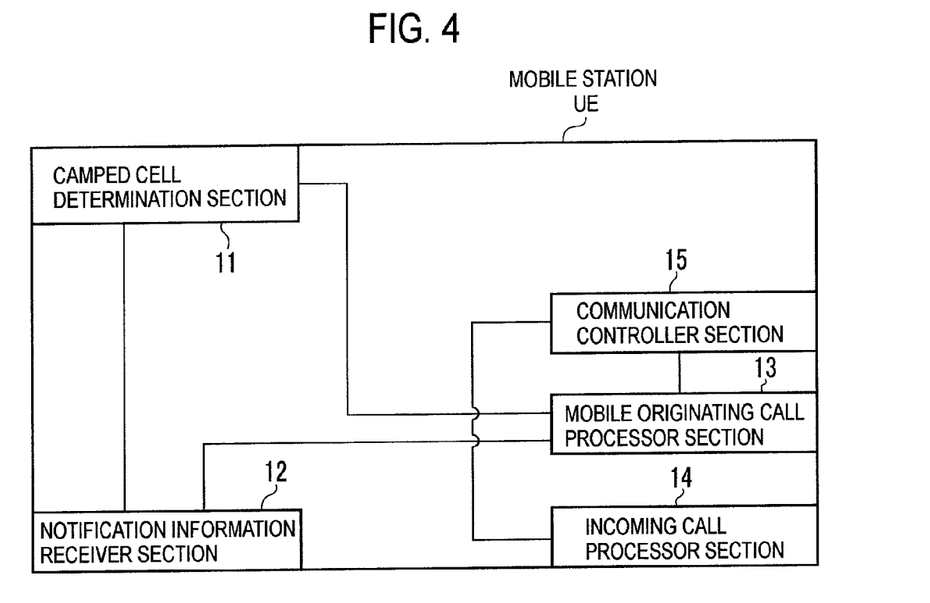
FIG. 4 is a functional block diagram of a mobile station according to the first embodiment of the present invention.

As shown in FIG. 4, the mobile station UE includes a camped cell determination section 11, a broadcast information receiver section 12, a mobile originating call processor section 13, an incoming call processor section 14, and a communication controller section 15.

The camped cell determination section 11 is configured to determine a cell (a camped cell) which has to perform a camping in the mobile station according to various pieces of broadcast information received by the broadcast information receiver section 12.

Specifically, the camped cell determination section 11 may be configured to use the CSG cell as a camped cell, only when the cell is not managed as a specific mobile station and broadcast information indicating an allowance of a camping in the CSG cell is received.

In addition, the camped cell determination section 11 may be configured to use the CSG cell as a camped cell, only when the cell is not managed as a specific mobile station, a general cell fulfilling a predetermined radio condition cannot be detected except for the CSG cell, and when the broadcast information indicating an allowance of a camping in the CSG is received.

The broadcast information receiver section 12 is configured to receive various pieces of broadcast information transmitted from the base stations (the radio base station eNB and the home base station Home-eNB) which manage the cells (the general cell and the CSG cell) in the periphery of the mobile station UE.

The mobile originating call processor section 13 is configured to transmit the mobile originating call requests (Connection Request and Service Request) to the exchange apparatus MME and the base stations (the radio base station eNB and the home base station Home-eNB) which manage the camped cell of the mobile station UE.

Specifically, the mobile originating call processor section 13 is configured to be capable of transmitting the mobile originating call request to the CSG cell, as long as the broadcast information indicating a prohibition of a communication through the CSG cell is not received when the CSG cell is used as a camped cell.

In other words, the mobile originating call processor section 13 is configured to be incapable of transmitting the mobile originating call request to the CSG cell in the following case. The mobile station is not managed as a specific mobile station, and the broadcast information indicating a prohibition of a communication through the CSG cell by the general mobile station is received even when the CSG cell is used as a camped cell.

In addition, the mobile originating call processor section 13 is configured to be incapable of transmitting the mobile originating call request to the CSG cell in the following case. The mobile station is managed as a specific mobile station, and the broadcast information indicating a prohibition of a communication through the CSG cell by the specific mobile station is received even when the CSG cell is set as a camped cell.

The incoming call processor section 14 is configured to perform incoming call processing in response to the paging signal received from the exchange apparatus MME and the base stations (the radio base station eNB and the home base station Home-eNB) which manage the camped cell of the mobile station UE.

The communication controller section 15 is configured to transmit uplink user data according to the data transmission rate notified by a scheduling signal transmitted from the base stations (the radio base station eNB and the home base station Home-eNB) which manage the camped cell of the mobile station UE.

Operation of Mobile Communication System
According to First Embodiment of the Invention Referring to FIGS. 5 to 10, the operation of the mobile communication system according to the first embodiment of the invention is described.

Figure 5:
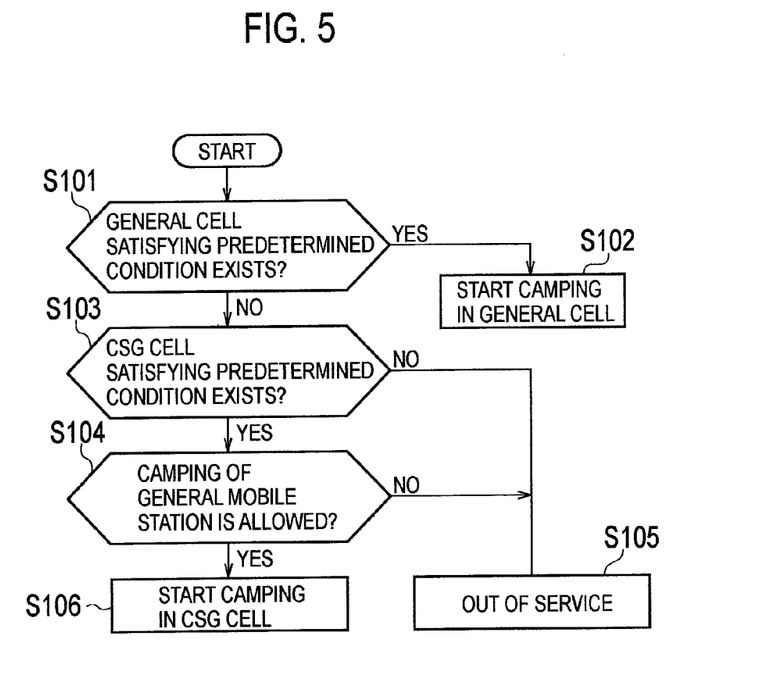
FIG. 5 is a flowchart showing an operation of determining a camped cell of the mobile station according to the first embodiment of the present invention.

Firstly, referring to FIG. 5, a description is given of an operation how the mobile station UE according to this embodiment determines a camped cell when the mobile station UE is not managed as a specific mobile station (i.e., in a case of a general mobile station).

As shown in FIG. 5, at step S101, the mobile station UE determines whether or not there is a general cell fulfilling a predetermined radio condition (a predetermined condition).

Here, the mobile station UE can determine whether or not each of the cells is a "general cell" or a "CSG cell", on the basis of broadcast information ("CSG Flag") received from the cell.

In addition, the mobile station UE can determine whether or not the mobile station UE is managed as a specific mobile station, on the basis of broadcast information ("TA-ID" and "Cell-ID") received from the cell.

Furthermore, the mobile station UE determines that a predetermined radio condition is fulfilled in the cell, when "RSRP (Reference Signal Received Power)" or "RSRQ (Reference Signal Received Quality)" in the cell is equal to or larger than a predetermined threshold.

When it is determined that there is a general cell fulfilling the predetermined radio condition, the mobile station UE starts a camping in the general cell at step S102.

On the other hand, when it is determined that there is not a general cell fulfilling the predetermined radio condition, the mobile station UE determines whether or not a CSG cell fulfilling the predetermined radio condition (predetermined condition) at step S103.

When it is determined that there is a CSG cell fulfilling the predetermined radio condition (a predetermined condition), the mobile station UE detects that the mobile station UE is out of service at step S105.

On the other hand, when it is determined that there is a CSG cell fulfilling the predetermined radio condition (predetermined condition), the mobile station UE determines whether or not to allow a camping of the general mobile station in the CSG cell at step S104.

Specifically, the mobile station UE determines whether or not allow a camping of the general mobile station in the CSG cell, on the basis of the broadcast information (e.g., a 1-bit flag indicating whether or not to allow a camping in the CSG cell when a cell fulfilling a predetermined radio condition cannot be detected except for the CSG cell) received from the home base station Home-eNB which manages the CSG cell.

When it is determined that a camping of the general mobile station in the CSG cell is not allowed, the mobile station UE detects that the mobile station UE is out of service at step S105.

On the other hand, when it is determined that a camping of the general mobile station in the CSG cell is allowed, the mobile station UE starts the camping in the CSG cell at step S106.

Figure 6:
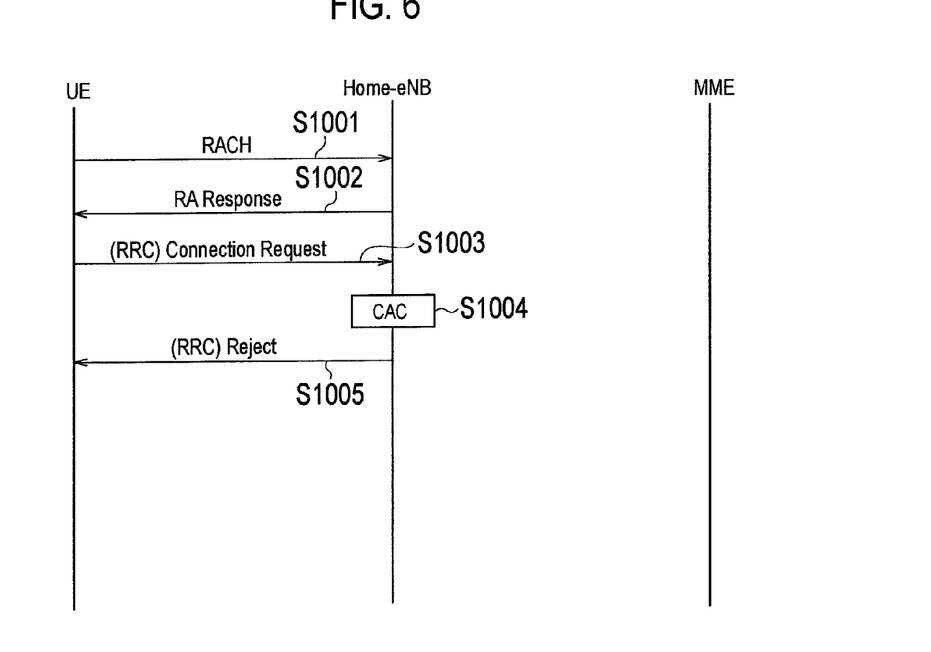
FIG. 6 is a sequential diagram showing mobile originating call processing in the mobile communication system according to the first embodiment of the present invention.

Secondly, referring to FIG. 6, a description is given of an operation of mobile originating call processing which is performed in a case where the mobile station UE according to this embodiment is not managed as a specific mobile station (i.e., a general mobile station) and where the CSG cell under control of the home base station Home-eNB is used as a camped cell.

It should be noted that in an example of FIG. 6, a congestion occurs in the CSG, and thus the general mobile station is prohibited from performing a communication through the CSG. The home base station Home-eNB has not transmitted the broadcast information indicating to that effect, to the mobile station UE.

At step S1001, the mobile station UE instructed by the user to make a mobile originating call transmits RACH (Random Access Channel) to the home base station Home-eNB which manages a camped cell of the mobile station UE.

At step S1002, the home base station Home-eNB returns "RA Response" to the mobile station UE, in response to the received RACH.

At step S1003, the mobile station UE transmits "Connection Request (mobile originating call request)" to the home base station Home-eNB by RRC (Radio Resource Control).

The home base station Home-eNB performs "CAC (Call Admission Control) processing" in response to the received "Connection Request (mobile originating call request)" at step S1004, and transmits "Reject" to the mobile station UE by the RRC at step S1005, "Reject" indicating that acceptance of the above-described "Connection Request (mobile originating call request)" is rejected.

Figure 7:
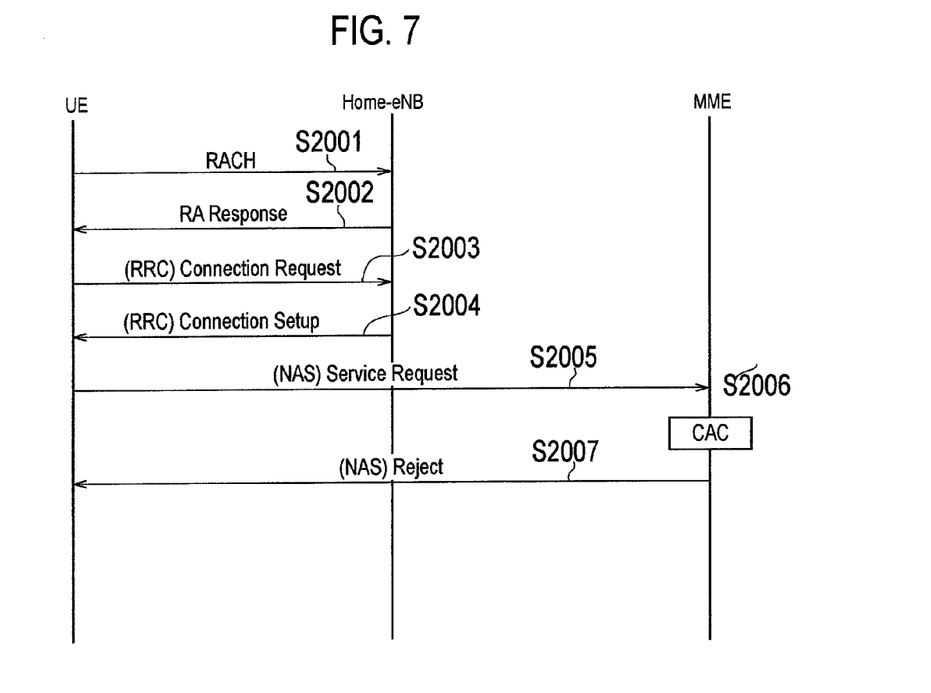
FIG. 7 is a sequential diagram showing the mobile originating call processing in the mobile communication system according to the first embodiment of the present invention.

Thirdly, referring to FIG. 7, a description is given of an operation of mobile originating call processing which is performed in a case where the mobile station UE according to this embodiment is not managed as a specific mobile station (i.e., a general mobile station) and where the CSG cell under control of the home base station Home-eNB is used as a camped cell.

It should be noted that in an example of FIG. 7, a congestion occurs in the CSG, and thus the general mobile station is prohibited from performing the communication through the CSG cell. The exchange apparatus MME has not transmitted broadcast information indicating to that effect, to the mobile station UE through the home base station Home-eNB.

At step S2001, the mobile station UE instructed by the user to make a mobile originating call transmits RACH to the home base station Home-eNB which manages a camped cell of the mobile station UE.

At step S2002, the home base station Home-eNB returns "RA Response" to the mobile station UE, in response to the received RACH.

At step S2003, the mobile station UE transmits "Connection Request (mobile originating call request)" to the home base station Home-eNB by the RRC.

At step S2004, the home base station Home-eNB sets a radio bearer between the mobile station UE and itself, in response to the received "Connection Request (mobile originating call request)", and transmits "Connection Setup" indicating to that effect, to the mobile station UE.

At step S2005, the mobile station UE transmits "Service Request (mobile originating call request)" to the exchange apparatus MME through the home base station Home-eNB by NAS (Non-Access Stratum).

The exchange apparatus MME performs "CAC processing" in response to the received "Service Request (mobile originating call request)" at step S2006, and transmits "Reject" to the mobile station UE by the NAS at step S2007, the "Reject" indicating that acceptance of the above-described "Service Request (mobile originating call request)" is rejected.

Figure 8:
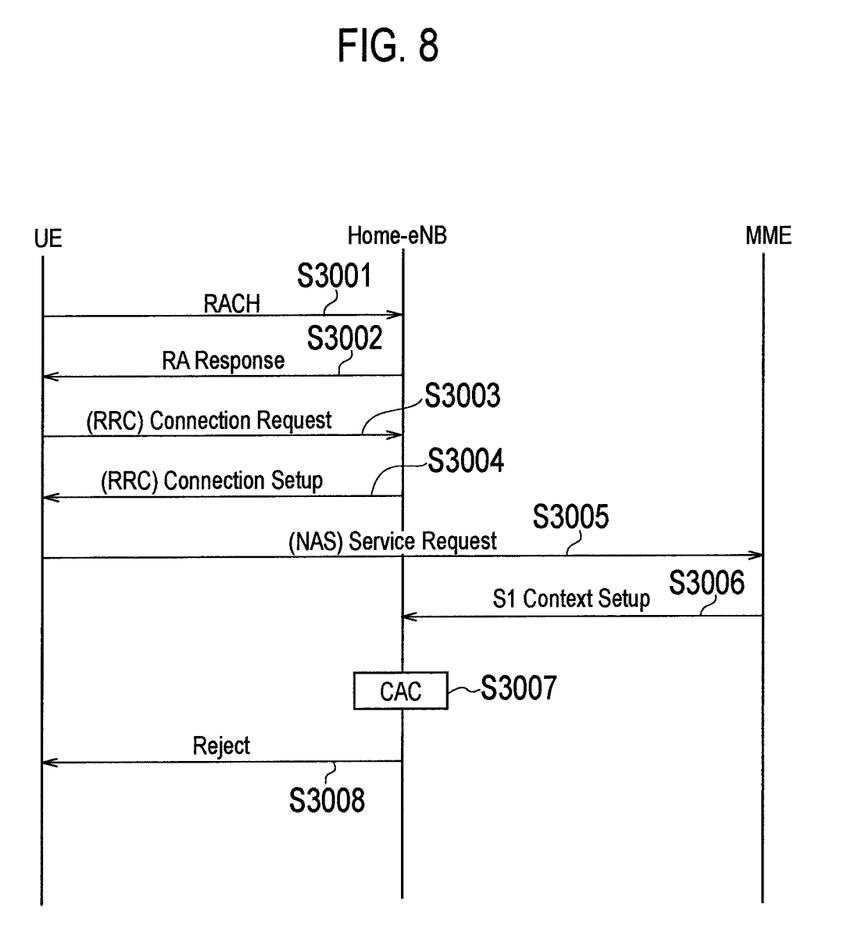
FIG. 8 is a sequential diagram showing the mobile originating call processing in the mobile communication system according to the first embodiment of the present invention.

Fourthly, referring to FIG. 8, a description is given of an operation of mobile originating call processing which is performed in a case where the mobile station UE according to this embodiment is not managed as a specific mobile station (i.e., a general mobile station) and where the CSG cell under control of the home base station Home-eNB is used as a camped cell.

It should be noted that in an example of FIG. 8, a congestion occurs in the CSG, and thus the general mobile station is prohibited from performing the communication through the CSG cell. The home base station Home-eNB has not transmitted broadcast information indicating to that effect, to the mobile station UE.

As shown in FIG. 8, the operations of step S3001 to S3005 are same as operations of steps S2001 to S2005 shown in FIG. 7.

At step S3006, the exchange apparatus MME sets an EPS (Evolved Packet System) bearer between the mobile station UE and itself, in response to the received "Service Request (mobile originating call request)", and transmits "S1 Context Setup" indicating to that effect, to the home base station Home-eNB.

The home base station Home-eNB performs "CAC processing" in response to the received "S1 Context Request (mobile originating call request)" at step S3007, and transmits "Reject" to the mobile station UE at step S3008, the "Reject" indicating that acceptance of the above-described "Service Request (mobile originating call request)" is rejected.

Figure 9:
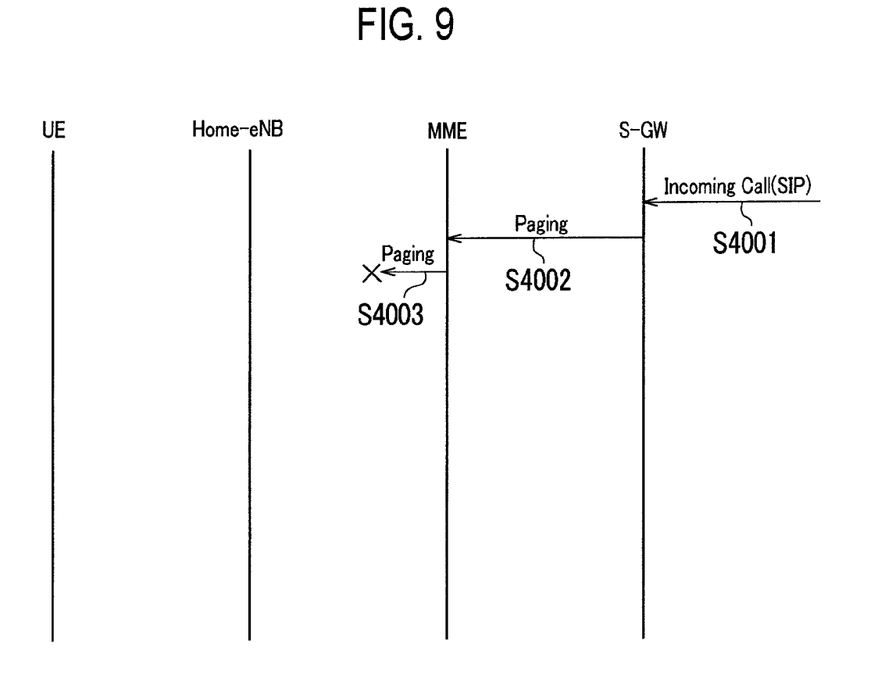
FIG. 9 is a sequential diagram showing incoming call processing in the mobile communication system according to the first embodiment of the present invention.

Fifthly, referring to FIG. 9, a description is given of an operation of incoming call processing which is performed for the mobile station UE in a case where the mobile station UE according to this embodiment is not managed as a specific mobile station (i.e., a general mobile station) and where the CSG cell under control of the home base station Home-eNB is used as a camped cell.

It should be noted that in an example of FIG. 9, a congestion occurs in the CSG, and thus the general mobile station is prohibited from performing the communication through the CSG cell and the exchange apparatus MME knows the prohibition.

As shown in FIG. 9, the gateway device S-GW receives an incoming call signal (SIP message) addressed to the mobile station UE at step S4001, and transmits a paging signal indicating to the effect and addressed to the mobile station UE to the exchange apparatus MME at step S4002.

At step S4003, the exchange apparatus MME discards the paging signal addressed to the mobile station UE without transferring the paging signal to the home base station Home-eNB, because the general mobile station of the mobile station UE is prohibited in the camped cell (the CSG cell) from performing the communication through the CSG cell.

Figure 10:
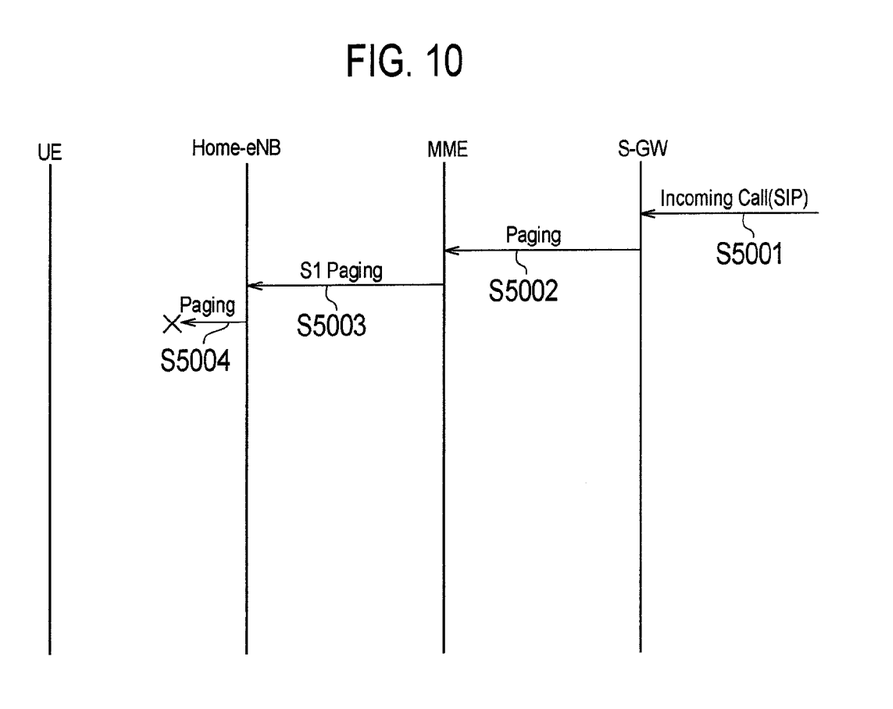
FIG. 10 is a sequential diagram showing the incoming call processing in the mobile communication system according to the first embodiment of the present invention.

Sixthly, referring to FIG. 10, a description is given of an operation of incoming call processing which is performed for the mobile station UE in a case where the mobile station UE according to this embodiment is not managed as a specific mobile station (i.e., a general mobile station) and where the CSG cell under control of the home base station Home-eNB is used as a camped cell.

It should be noted that in an example of FIG. 10, a congestion occurs in the CSG, and thus the general mobile station is prohibited from performing a communication through the CSG cell and the home base station Home-eNB knows the prohibition.

As shown in FIG. 10, the gateway device S-GW receives an incoming call signal (SIP message) addressed to the mobile station UE at step S5001, and transmits a paging signal indicating to that effect and addressed to the mobile station UE, to the exchange apparatus MME at step S5002.

At step S5003, the exchange apparatus MME transfers the paging signal addressed to the mobile station UE to the home base station Home-eNB.

At step S5004, the home base station Home-eNB discards the paging signal addressed to the mobile station UE without transferring the paging signal to the mobile station UE, because the general mobile station is prohibited in the camped cell (the CSG cell) of the mobile station UE from performing a communication through the CSG cell.

Advantageous Effects of Mobile Communication System According to First Embodiment of the Present Invention The mobile communication system according this embodiment can allow a communication through a CSG cell by transmitting broadcast information to a general mobile station UE other then a specific mobile station, when a cell fulfilling a predetermined communication quality cannot be detected except for the CSG cell under control of a home base station Home-eNB. Accordingly, an area in which the general mobile station UE can perform a communication can be expanded.

In addition, the mobile communication system according to this embodiment differentiates between the specific mobile station and the general mobile station with respect to the communication in the CSG cell. Accordingly, an owner of the home base station Home-eNB (normally a user of the specific mobile station as well) is favorably treated and an area in which the general mobile station UE can perform a communication can be effectively expanded.

In addition, the mobile communication system according to this embodiment can avoid a problem of interference caused by the CSG cell.

It should be noted that the operations of the mobile station UE, the home base stations Home-eNB, and the exchange apparatus MME may be implemented by hardware, a software module executed by a processor, or a combination thereof.

The software module may be provided in a storage medium in any form, such as a RAM (Random Access Memory), a flash memory, a ROM (Read Only Memory), an EPROM (Erasable Programmable ROM), an EEPROM (Electronically Erasable and Programmable ROM), a register, a hard disk, a removable disk, or a CD-ROM.

The above-described storage medium is connected to the processor so that the processor can read and write information from and in the storage medium. Also, the above-described storage medium may be integrated with the processor. Moreover, the above-described storage medium and the processor may be provided in an ASIC. The ASIC may be provided in the mobile station UE and the radio base stations eNB. In addition, the storage medium and the processor may be provided in each of the mobile station UE and the radio base stations eNB as a discrete component.

As described above, the invention is described in detail by using the above-described embodiments. However, it is obvious for a person skilled in the art that the invention is not limited to the embodiments described herein. The invention can be implemented in an improved or modified form without departing from the gist and the scope of the invention which are defined by the scope of claims. Accordingly, what is described in the present description aims to illustrate the invention and does not have any intend to limit the invention.

It should be noted that the entire contents of Japanese Patent Application No. 2007-281021 (filed Oct. 29, 2007) are incorporated herein by reference.

INDUSTRIAL APPLICABILITY

As described above, the present invention can provide a mobile communication system, a base station, and a mobile station with which a general mobile station other than a specific mobile station can be permitted a communication through a specific cell (a CSG cell) by transmitting broadcast information.

The invention claimed is:

1. A mobile communication system, wherein
the mobile communication system is configured to manage a specific mobile station which is allowed to communicate through a specific cell;
a general mobile station is configured to be capable of using a general cell as a camped cell, the general cell being a cell which excludes a Closed Subscriber Group (CSG) cell;
the general mobile station other than the specific mobile station is configured to be capable of using the specific cell as a camped cell, when a first broadcast information indicating an allowance of a camping in the specific cell is received;
the general mobile station using the specific cell as a camped cell is configured to transmit a connection request to the specific cell and configured to be capable of communicating through the specific cell, as long as broadcast information indicating a prohibition of a communication through the specific cell is not received;
the specific cell is the Closed Subscriber Group (CSG) cell, the specific mobile station belongs to the CSG, and the general mobile station does not belong to the CSG before the general mobile station receives the first broadcast information, and
a charge of a communication performed by the specific mobile station through the specific cell is configured to be differentiated from a charge of a communication performed by the general mobile station through the specific cell.

2. The mobile communication system according to claim 1, wherein a reception control method for a mobile originating call request transmitted by the specific mobile station to the specific cell is configured to be differentiated from a reception control method for a mobile originating call request transmitted by the general mobile station to the specific cell.

3. The mobile communication system according to claim 1, wherein a transmission probability or a restriction probability of a mobile originating call request for the specific cell by the specific mobile station is configured to be differentiated from a transmission probability or a restriction probability of a mobile originating call request for the specific cell by the general mobile station.

4. The mobile communication system according to claim 1, wherein a type of communication service providable to the specific mobile station through the specific cell is configured to be differentiated from a type of communication service providable to the general mobile station through the specific cell.

5. The mobile communication system according to claim 1, wherein a data transmission rate in an uplink communication performed by the specific mobile station through the specific cell is configured to be differentiated from a data transmission rate in an uplink communication performed by the general mobile station through the specific cell.

6. The mobile communication system according to claim 1, wherein a service quality of a communication performed by the specific mobile station through the specific cell is configured to be differentiated from a service quality of a communication performed by the general mobile station through the specific cell.

7. A mobile station which is used in a mobile communication system configured to manage a specific mobile station which is allowed to communicating through a specific cell, the mobile station comprising:
a camped cell determination section configured to be capable of using the specific cell as a camped cell, when the mobile station is not managed as the specific mobile station, and when a first broadcast information indicating an allowance of a camping in the specific cell is received;
the camped cell determination section is configured to be capable of using a general cell as a camped cell, the general cell being a cell which excludes a Closed Subscriber Group (CSG) cell;
a mobile originating call processor section configured to be capable of transmitting a connection request to the specific cell, when the specific cell is used as a camped cell, unless the broadcast information indicating a prohibition of a communication through the specific cell is received,
wherein the specific cell is the Closed Subscriber Group (CSG) cell, the specific mobile station belongs to the CSG, and the general mobile station does not belong to the CSG before the general mobile station receives the first broadcast information, and
wherein a charge of a communication performed by the specific mobile station though the specific cell is configured to be differentiated from a charge of a communication performed by the general mobile station through the specific cell.

* * * * *